United States Patent [19]

Fukumoto

[11] Patent Number: 5,659,422
[45] Date of Patent: Aug. 19, 1997

[54] EYEPIECE

[75] Inventor: Satoshi Fukumoto, Machida, Japan

[73] Assignee: Nikon Corporation, Tokyo, Japan

[21] Appl. No.: 412,910

[22] Filed: Mar. 29, 1995

[30] Foreign Application Priority Data

Apr. 6, 1994 [JP] Japan .................................. 6-093084

[51] Int. Cl.$^6$ .................................................. G02B 25/00
[52] U.S. Cl. ............................................................ 359/644
[58] Field of Search .................................... 359/643, 644, 359/645, 646, 647

[56] References Cited

FOREIGN PATENT DOCUMENTS 489063   10/1975   U.S.S.R. .................................. 359/643

*Primary Examiner*—Scott J. Sugarman
*Attorney, Agent, or Firm*—Shapiro and Shapiro

[57] ABSTRACT

An eyepiece comprises, in the following order from the image side, a first lens unit G1 including a negative lens with a concave surface facing the image, a second lens unit G2 including a cemented lens composed of a negative lens and a positive lens arranged in the mentioned order from the image side, a third lens unit G3 including a cemented lens composed of a positive lens and a negative lens, and a fourth lens unit G4 including a positive lens.

6 Claims, 4 Drawing Sheets

SPHERICAL
ABERRATION

ASTIGMATISM

DISTORTION

SPHERICAL ABERRATION

ASTIGMATISM

DISTORTION

EYEPIECE

BACKGROUND OF THE INVENTION

1. Field of the Invention

The present invention relates to an eyepiece, and more particularly to an eyepiece used in telescopes, microscopes, etc.

2. Related Background Art

In general, in order to facilitate observation of the field in an eyepiece from the center to the periphery thereof, an eye relief (an axial distance between a most-eye-side lens surface of the eyepiece and the eye point) is desired to be at least 80% of a focal length of the eyepiece. It is, however, well known that the eye relief becomes shorter as an apparent field of view increases while keeping aberrations of marginal rays of the eyepiece in a certain state. It is also well known that in order to increase the eye relief without decreasing the apparent field of view, it is necessary to increase the size of an aperture of an eye-side lens system. This, however, results in drastic deterioration of aberrations of marginal rays, astigmatism and distortion in particular.

As described above, conventional eyepieces had a problem that it was very difficult to secure a wide apparent field of view and a long eye relief at a time while correcting aberrations well.

SUMMARY OF THE INVENTION

The present invention has been accomplished in view of the above problem, and an object of the invention is to provide an eyepiece having a wide apparent field of view and a long eye relief as well, while correcting aberrations well.

In order to solve the above problem, the present invention provides an eyepiece comprising, in the following order from the image side, a first lens unit G1 including a negative lens with a concave surface facing the image, a second lens unit G2 including a cemented lens composed of a negative lens and a positive lens arranged in the mentioned order from the image side, a third lens unit G3 including a cemented lens composed of a positive lens and a negative lens, and a fourth lens unit G4 including a positive lens. Here, the order of the positive lens and the negative lens constituting the cemented lens of the third lens unit G3 is arbitrary; that is, they may be arranged in a positive-negative order or in a negative-positive order.

In a preferred aspect of the present invention, the following conditions are satisfied:

$$0 < r5/r3 \leq 0.95$$

$$-1.9 \leq r5/f \leq -1.0$$

where f is a combinational focal length of the entire lens system, r3 is a radius of curvature of an image-side surface of the cemented lens of the second lens unit G2, and r5 is a radius of curvature of an eye-side surface of the cemented lens of the second lens unit G2.

As described above, the eyepiece of the present invention is composed, in the following order from the image side, of the first lens unit G1 including the negative lens with a concave surface facing the image, the second lens unit G2 including the cemented lens composed of the negative lens and the positive lens arranged in the mentioned order from the image side, the third lens unit G3 including the cemented lens composed of the positive lens and the negative lens, and the fourth lens unit G4 including the positive lens.

By constructing and arranging the eyepiece in the above manner so that the third lens unit G3 includes the cemented lens composed of the positive lens and the negative lens and the fourth lens unit G4 includes the positive lens, a position of the rear principal point of the combined system of the third lens unit G3 with the fourth lens unit G4 can be moved backward. As a result, the eye relief of the eyepiece can be remarkably expanded.

Here, the two lenses constituting the cemented lens of the third lens unit G3 may be arranged in order positive-negative or in a negative-positive order from the image side.

The equations of the conditions of the present invention are detailed in the following.

In addition to the above-described structure, it is preferred in the present invention that the following Conditions (1) and (2) be satisfied in order to secure a long eye relief while effecting well-balanced correction of aberrations.

$$0 < r5/r3 \leq 0.95 \tag{1}$$

$$-1.9 \leq r5/f \leq -1.0 \tag{2}$$

where f: a combined focal length of the entire lens system;

r3: a radius of curvature of an image-side surface of the cemented lens of the second lens unit G2;

r5: a radius of curvature of an eye-side surface of the cemented lens of the second lens unit G2.

Conditions (1) and (2) define the shape of the cemented lens of the second lens unit G2.

When Conditions (1) and (2) are satisfied, the cemented lens of the second lens unit G2 can be formed in a positive meniscus configuration with a concave surface facing the image, so that the rear principal point thereof can be moved backward, which advantageously works to increase the eye relief. Further, when the above conditions are satisfied as to the configuration of the cemented lens of the second lens unit G2, a Petzval's sum can be decreased, whereby astigmatism and curvature of field can be reduced.

Below the lower limit of Condition (1), the cemented lens of the second lens unit G2 cannot be of the meniscus configuration, so that a sufficient eye relief cannot be secured, which is thus not preferred.

Conversely, above the upper limit of Condition (1), the rear principal point moves too far backward. Also, apertures of the third lens unit G3 and succeeding lens unit become too large and well-balanced correction becomes difficult for aberrations such as astigmatism and curvature of field, which is not preferred.

If the upper limit of Condition (1) became large, a diverging effect would become strong, resulting in considerably increasing the apertures of the third lens unit and succeeding lens unit. In Condition (1) the upper limit is determined to be 0.95, which causes no practical problems for aberrations and apertures, but the upper limit may be preferably set to 0.8, more preferably to 0.6, whereby individual aberrations can be corrected in a better balance.

If the focal length of the eyepiece is long, a sufficiently long eye relief can be attained even with the upper limit of 0.5 while making aberrations of astigmatism, curvature of field, etc. small.

Furthermore, it is preferred that the following Condition (3) be satisfied in order to effect well-balanced correction of individual aberrations.

$$|f/f21| \leq 0.4 \tag{3}$$

where f12 is a combined focal length of the first lens unit G1 and the second lens unit G2.

Condition (3) is for defining an appropriate range for the combined focal length f12 of the first lens unit G1 and the second lens unit G2.

Within the range of Condition (3), a Petzval sum of the combined lens system of the first lens unit G1 with the second lens unit G2 can be made small or negative. As a result, a good balance can be established for arrangement of refractive powers between these lens units (the first lens unit G1 and the second lens unit G2) and the lens units after them, so that well-balanced correction can be made for aberrations of astigmatism, curvature of field, etc.

Departing from the range of Condition (3), the balance becomes poor for arrangement of refractive powers of the respective lens units, resulting in degrading aberrations in the periphery of field.

If the upper limit of Condition (3) is set to 0.2, the individual aberrations can be corrected with a better balance. If the upper limit in the range of Condition (3) is set to 0.11, an arrangement of refractive powers that can provide even better correction for individual aberrations can be attained.

Further, it is preferred that the following Conditions (4) and (5) be satisfied in order to effect well-balanced correction for lateral chromatic aberration and coma.

$$1.7 \leq n \quad (4)$$

$$\upsilon \leq 30 \quad (5)$$

where n: a refractive index for the d line, of the negative lens in the third lens unit G3;

$\upsilon$: an Abbe number for the d line, of the negative lens in the third lens unit G3.

Conditions (4) and (5) are those for effecting well-balanced correction of lateral chromatic aberration and coma while decreasing them as well.

Departing from the ranges of Conditions (4) and (5), particularly the lateral chromatic aberration cannot be decreased, which is not preferred.

If the lower limit of Condition (4) is set to 1.725 and if the upper limit of Condition (5) to 28.5, the lateral chromatic aberration and coma can be corrected with a better balance.

Further, in order to sufficiently expand the eye relief and to effect well-balanced correction of individual aberrations, an image-side surface of the negative lens in the first lens unit G1 is a concave surface facing the image and in addition, the following Condition (6) is preferably satisfied:

$$-3.3 \leq f1/f \leq -1.6 \quad (6)$$

where f1 is a focal length of the first lens unit G1.

Condition (6) is for obtaining an arrangement of refractive powers for effecting well-balanced correction of individual aberrations while keeping a sufficiently long eye relief.

In order to expand the eye relief, a negative refractive power of the first lens unit G1 needs to be increased. Then, satisfying the range of Condition (6), a sufficiently long eye relief can be attained while effecting well-balanced correction of individual aberrations.

Below the lower limit of Condition (6), the negative refractive power of the first lens unit G1 becomes too small, so that the eye relief cannot be expanded, which is not preferable.

Conversely, above the upper limit of Condition (6), the negative refractive power becomes too large, which increases the apertures of the second lens unit G2 and succeeding lens units, and with the increase of aperture, aberrations are aggravated in the periphery of the field, which is not preferable.

As the refractive power of the first lens unit G1 increases, radii of curvature of lens surfaces of the first lens unit G1 need to be decreased therewith. In that case, if the eye-side surface of the negative lens in the first lens unit G1 is a concave surface with a smaller radius of curvature to the eye, an air gap between the first lens unit G1 and the second lens unit G2 needs to be large in order to avoid interference with an adjacent lens surface. However, if the air gap between the first lens unit G1 and the second lens unit G2 is large, the first lens unit G1 becomes closer to the image surface, which will cause an inconvenience that dust attached onto a lens surface can to be seen.

Then, if the image-side surface of the negative lens in the first lens unit G1 is a concave surface facing the image, if refractive power is separately assigned to the image-side surface and the eye-side surface of the negative lens in the first lens unit G1 (employing a configuration of double convex lens), or if the negative lens in the first lens unit G1 is of a meniscus configuration, the above inconvenience can be overcome. In this case, it is preferred that the following Condition (7) be further satisfied:

$$|r1/r2| \leq 1 \quad (7)$$

where r1: a radius of curvature of the image-side surface of the negative lens in the first lens unit G1;

r2: a radius of curvature of the eye-side surface of the negative lens in the first lens unit G1.

DETAILED DESCRIPTION OF THE PREFERRED EMBODIMENTS

The embodiments of the present invention will be described with reference to the accompanying drawings.

In each embodiment, an eyepiece of the present invention comprises, in the following order from the image side, a first lens unit G1 including a negative lens with a concave surface facing the image, a second lens unit G2 including a cemented lens composed of a negative lens and a positive lens arranged in the mentioned order from the image side, a third lens unit G3 including a cemented lens composed of a positive lens and a negative lens, and a fourth lens unit G4 including a positive lens.

In the following embodiments the positive lens and the negative lens constituting the cemented lens of the third lens unit G3 are arranged in the positive-negative order from the image side, but they may be turned around, that is, arranged in the negative-positive order from the image side.

EMBODIMENT 1

Figure 1:
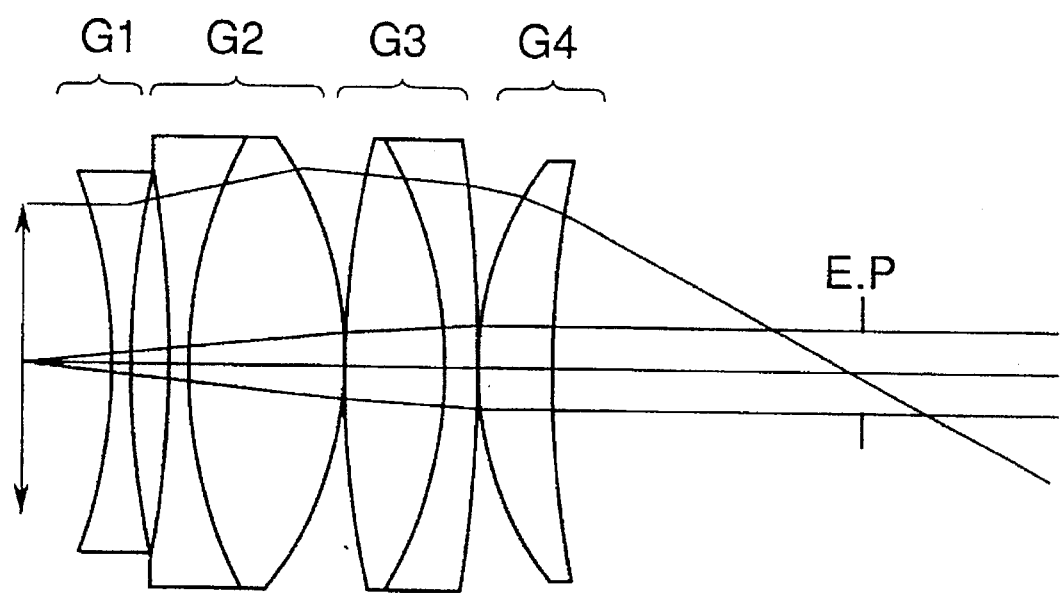
FIG. 1 is a drawing to show a construction of an eyepiece according to a first embodiment of the present invention.

FIG. 1 is a drawing to show a construction of an eyepiece according to the first embodiment of the present invention.

The eyepiece as shown is composed, in the following order from the image side, of the first lens unit G1 consisting of a double-concave lens, the second lens unit G2 consisting of a cemented lens of a double-concave lens and a double-convex lens, the third lens unit G3 consisting of a cemented lens of a double-convex lens and a negative meniscus lens with a concave surface facing the image, and the fourth lens unit G4 consisting of a positive meniscus lens with a convex surface facing the image.

In FIG. 1, E. P represents the eye point.

The following Table 1 shows specifications of Embodiment 1 of the present invention. In Table 1, numerals at the left end indicate orders of respective lens surfaces from the image side, r indicates radii of curvature of respective lens surfaces, d indicates separations between lens surfaces, and n and $\upsilon$ indicate refractive indices and Abbe numbers, respectively, for the d line ($\lambda$=587.6 nm).

TABLE 1

Focal length of the entire lens system f = 10.0
Apparent visual angle 54°
Eye relief 10.7

| | r | d | ν | n |
|---|---|---|---|---|
| 1 | −18.65 | 0.80 | 60.14 | 1.620 |
| 2 | 74.16 | 0.85 | | |
| 3 | −50.67 | 0.80 | 27.61 | 1.755 |
| 4 | 17.40 | 5.07 | 53.93 | 1.713 |
| 5 | −12.75 | 0.11 | | |
| 6 | 40.03 | 3.47 | 53.93 | 1.713 |
| 7 | −12.87 | 0.80 | 25.50 | 1.805 |
| 8 | −42.89 | 0.11 | | |
| 9 | 11.78 | 2.67 | 60.14 | 1.620 |
| 10 | 77.39 | | | |

Values for the conditions f1=−23.957
f12=98.005
(1) r5/r3=0.252
(2) r5/f=−1.275
(3) f/f12=0.102
(4) n=1.805
(5) $\upsilon$=25.5
(6) f1/f=−2.396
(7) |r1/r2|=0.251

Figure 2A:
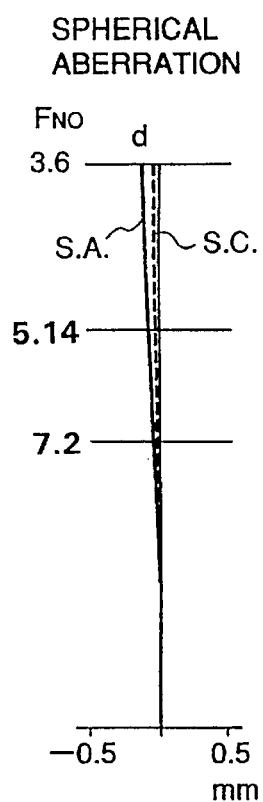
FIGS. 2A to 2C are diagrams of aberrations in the first embodiment of FIG. 1.
Figure 2B:
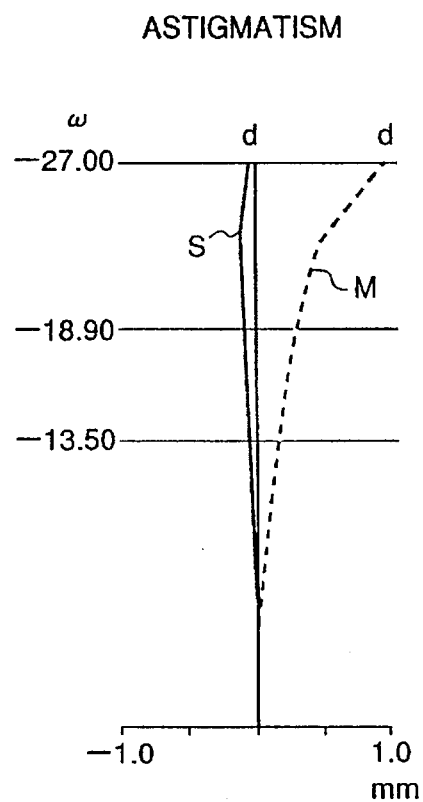
Figure 2C:
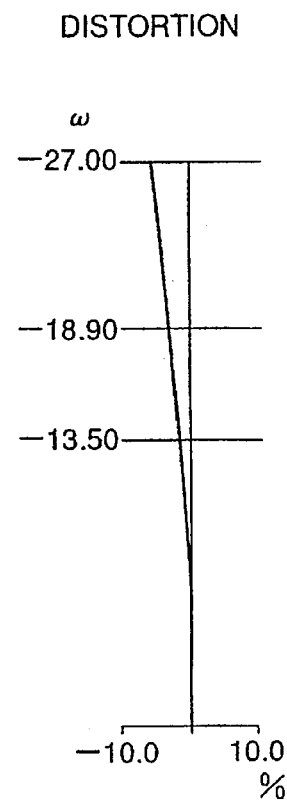

FIGS. 2A to 2C are diagrams of aberrations in Embodiment 1. Each aberration was obtained by tracing rays from the eye point side.

In each aberration diagram, FNO represents F-number, $\omega$ represents a field of view, and d represents the d line ($\lambda$=587.6 nm).

In aberration diagrams indicating astigmatism, the solid line S shows the sagittal image plane, while the dashed line M shows the meridional image plane. In aberration diagrams indicating spherical aberration, the solid line S. A. represents spherical aberration, while the dashed line S. C. represents the sine condition.

As is apparent from the aberration diagrams, the present embodiment is effective to secure a wide field (apparent field of view of 54°), to secure an eye relief longer than the focal length of the entire lens system, and to correct aberrations well.

EMBODIMENT 2

Figure 3:
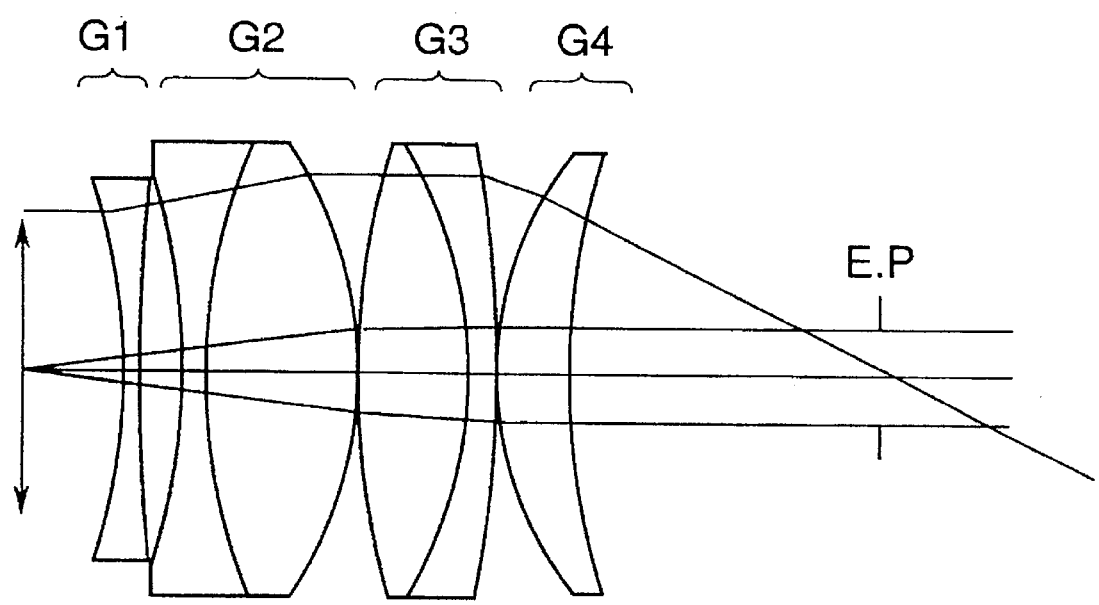
FIG. 3 is a drawing to show a construction of an eyepiece according to a second embodiment of the present invention.

FIG. 3 is a drawing to show a construction of an eyepiece according to the second embodiment of the present invention.

The eyepiece as shown is composed, in the following order from the image side, of the first lens unit G1 consisting of a negative meniscus lens with a concave surface facing the image, the second lens unit G2 consisting of a cemented lens of a double-concave lens and a double-convex lens, the third lens unit G3 consisting of a cemented lens of a double-convex lens and a negative meniscus lens with a concave surface facing the image, and the fourth lens unit G4 consisting of a positive meniscus lens with a convex surface facing the image.

In FIG. 3, E. P represents the eye point.

The following Table 2 shows specifications of Embodiment 2 of the present invention. In Table 2, numerals at the left end indicate orders of respective lens surfaces from the image side, r indicates radii of curvature of respective lens surfaces, d indicates separations between lens surfaces, and n and $\upsilon$ indicate refractive indices and Abbe numbers, respectively, for the d line ($\lambda$=587.6 nm).

TABLE 2

Focal length of the entire lens system f = 10.0
Apparent visual angle 54°
Eye relief 10.5

| | r | d | ν | n |
|---|---|---|---|---|
| 1 | −20.20 | 0.80 | 53.93 | 1.713 |
| 2 | −186.82 | 0.85 | | |
| 3 | −26.67 | 0.80 | 25.50 | 1.805 |
| 4 | 17.40 | 5.07 | 53.93 | 1.713 |
| 5 | −12.78 | 0.11 | | |
| 6 | 26.67 | 3.47 | 53.93 | 1.713 |
| 7 | −14.94 | 0.80 | 25.50 | 1.805 |
| 8 | −32.41 | 0.11 | | |
| 9 | 10.98 | 2.67 | 60.14 | 1.620 |
| 10 | 23.79 | | | |

Values for the conditions f1=−31.829
f12=398.498
(1) r5/r3=0.479
(2) r5/f=−1.278
(3) |f/f12|=0.025
(4) n=1.805
(5) $\upsilon$=25.5
(6) f1/f=−3.183
(7) |r1/r2|=0.108

Figure 4A:
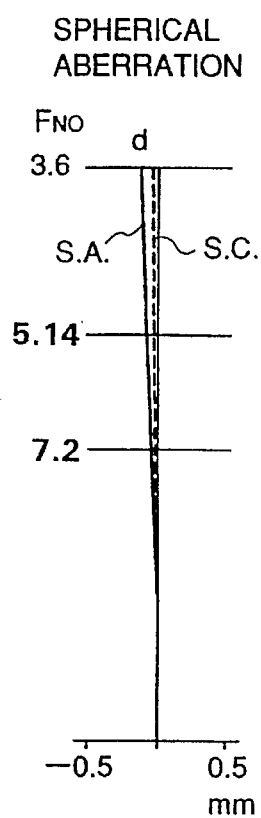
FIGS. 4A to 4C are diagrams of aberrations in the second embodiment of FIG. 3.
Figure 4B:
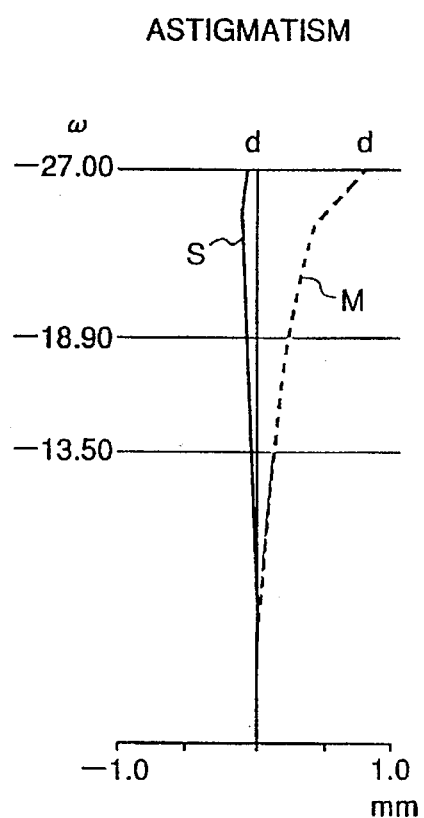
Figure 4C:
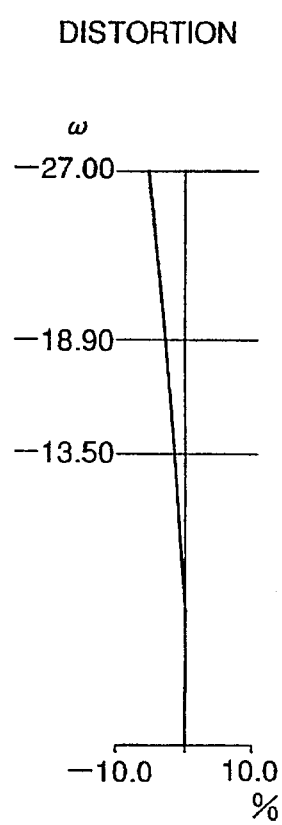

FIGS. 4A to 4C are diagrams of aberrations in Embodiment 2. Each aberration was obtained by tracing rays from the eye point side.

In each aberration diagram, FNO represents F-number, $\omega$ represents an angle of view, and d represents the d line ($\lambda$=587.6 nm).

In aberration diagrams indicating astigmatism, the solid line S shows the sagittal image plane, while the dashed line M shows the meridional image plane. In aberration diagrams indicating spherical aberration, the solid line S. A. represents spherical aberration, while the dashed line S. C. represents the sine condition.

As is apparent from the aberration diagrams, the present embodiment is effective to secure a wide field (apparent field of view of 54°), to secure an eye relief longer than the focal length of the entire lens system, and to correct aberrations well.

As detailed above, the eyepiece of the present invention has a wide field, i.e., the apparent field of view is 54°, is well corrected for aberrations, particularly astigmatism and curvature of field, and has an eye relief longer than the focal length of the entire eyepiece.

What is claimed is:

1. An eyepiece comprising, in the following order from an image side:
   a first lens unit consisting of a negative lens with a concave surface facing the image side;
   a second lens unit juxtaposed to said first lens unit and consisting of a cemented lens consisting of, in the following order from the image side, a negative lens and a positive lens;
   a third lens unit juxtaposed to said second lens unit and including a positive lens and a negative lens; and
   a fourth lens unit juxtaposed to said third lens unit and including a positive lens.

2. An eyepiece according to claim 1, wherein the following conditions are satisfied:

$$0 < r5/r3 \leq 0.95$$
$$-1.9 \leq r5/f \leq -1.0$$

where f is a combined focal length of the entire lens system, r3 is a radius of curvature of an image-side surface of the cemented lens of said second lens unit, and r5 is a radius of curvature of an eye-side surface of the cemented lens of said second lens unit.

3. An eyepiece according to claim 1, wherein the following condition is satisfied:

$$|f/f12| \leq 0.4$$

where f is a combined focal length of the entire lens system and f12 is a combined focal length of said first lens unit and said second lens unit.

4. An eyepiece according to claim 1, wherein the following conditions are satisfied:

$$1.7 \leq n$$
$$\upsilon \leq 30$$

where n is a refractive index, for the d line, of the negative lens in said third lens unit and $\upsilon$ is an Abbe number for the d line, of the negative lens in said third lens unit.

5. An eyepiece according to claim 1, wherein an image-side surface of the negative lens in said first lens unit is a concave surface, and the following condition is satisfied:

$$-3.3 \leq f1/f \leq -1.6$$

where f is a combined focal length of the entire lens system and f1 is a focal length of said first lens unit.

6. An eyepiece according to claim 1, wherein said negative lens in the first lens unit is closer to the image side than any other lens unit of the eyepiece.

* * * * *